United States Patent [19]

Rush et al.

[11] Patent Number: 4,729,106
[45] Date of Patent: Mar. 1, 1988

[54] FLUID DISTRIBUTION TO MULTIPLE USERS THROUGH DISTRIBUTED INTELLIGENCE SUB-CENTERS

[75] Inventors: William F. Rush, Tinley Park; James E. Huebler, Brookfield, both of Ill.

[73] Assignee: Institute of Gas Technology, Chicago, Ill.

[21] Appl. No.: 395,315

[22] Filed: Jul. 6, 1982

[51] Int. Cl.⁴ ............................................. G01F 1/00
[52] U.S. Cl. ................................. 364/510; 137/624.11; 137/236.1; 137/1; 364/465; 138/90
[58] Field of Search ............... 137/236, 624.11, 624.18, 137/624.2, 561 R, 1; 364/465, 510; 138/90, 98; 340/870.03; 15/104.06 A

[56] References Cited

U.S. PATENT DOCUMENTS

| | | | |
|---|---|---|---|
| 3,384,512 | 5/1968 | Frederick et al. | 15/104.06 A |
| 4,200,911 | 4/1980 | Matsumoto | 137/624.11 |
| 4,204,195 | 5/1980 | Bogacki | 340/870.03 |
| 4,272,984 | 6/1981 | Bell | 138/90 |

Primary Examiner—Alan Cohan
Attorney, Agent, or Firm—Thomas W. Speckman

[57] ABSTRACT

A process and system for fluid distribution from a principal intelligence and fluid distribution center to multiple users through distributed intelligence sub-centers. Intelligence transmission from individual user valves and meters to the distributed intelligence sub-centers and from the distributed intelligence sub-centers to the principal intelligence and fluid distribution center is achieved in conjunction with the piping by means such as wires within the cavity, wires embedded in the structure of the piping, wires along the exterior of the piping, fiber optics, or acoustic, electromagnetic or optical methods through the piping itself. The process and apparatus of this invention provides flow control, leak detection, pipe condition assessment, user meter readings, pipeline locator signals, robot control, and pipeline repair and cleaning. The process provides a total system approach providing improved safety and reduced operating costs and is particularly suited for underground distribution of natural gas services.

26 Claims, 6 Drawing Figures

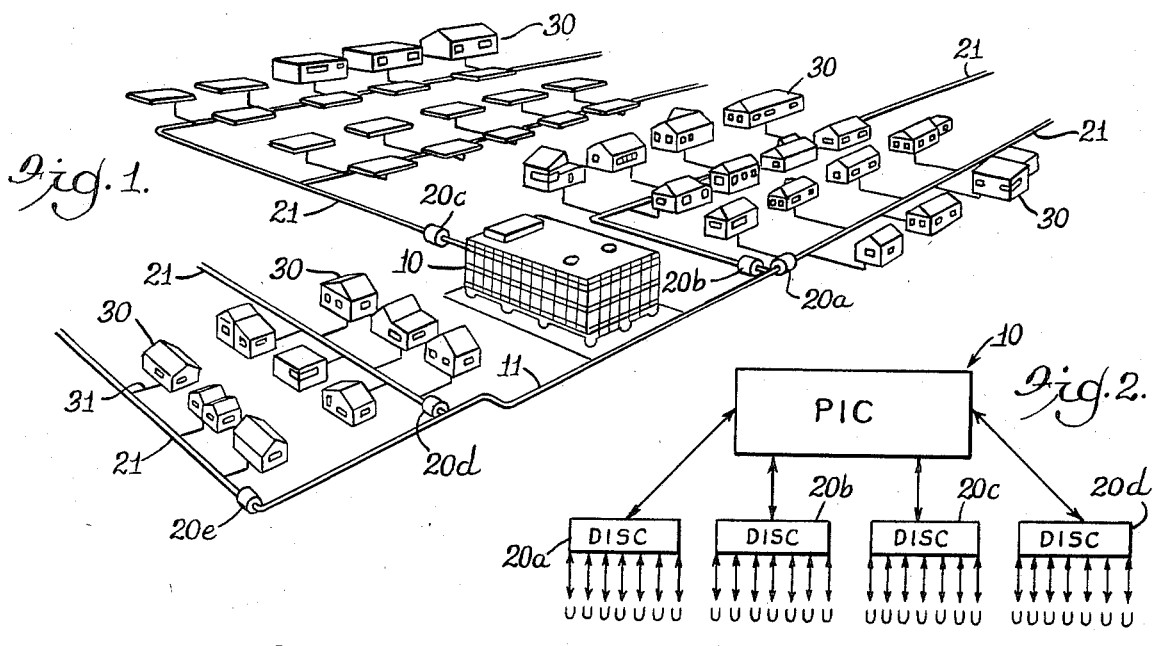
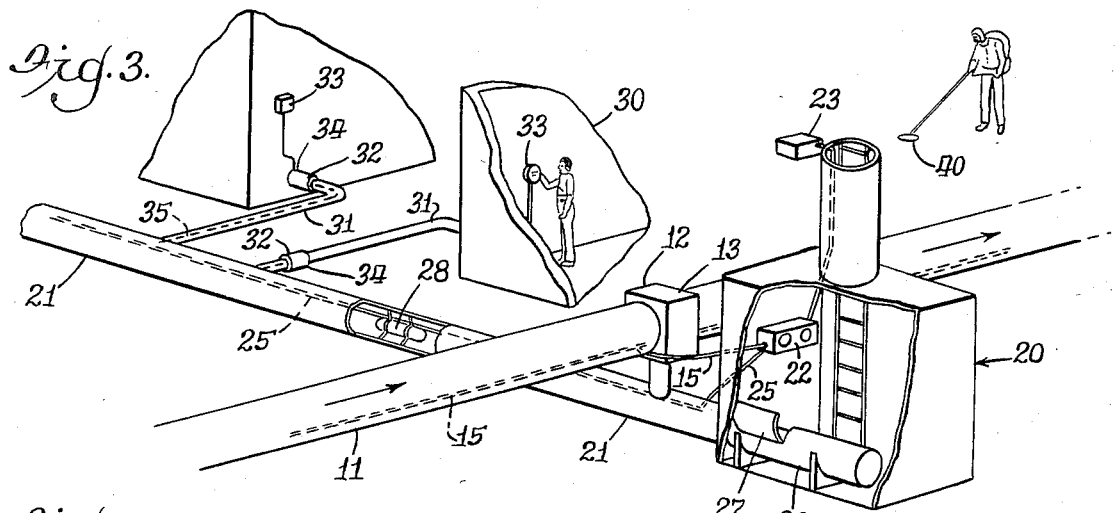
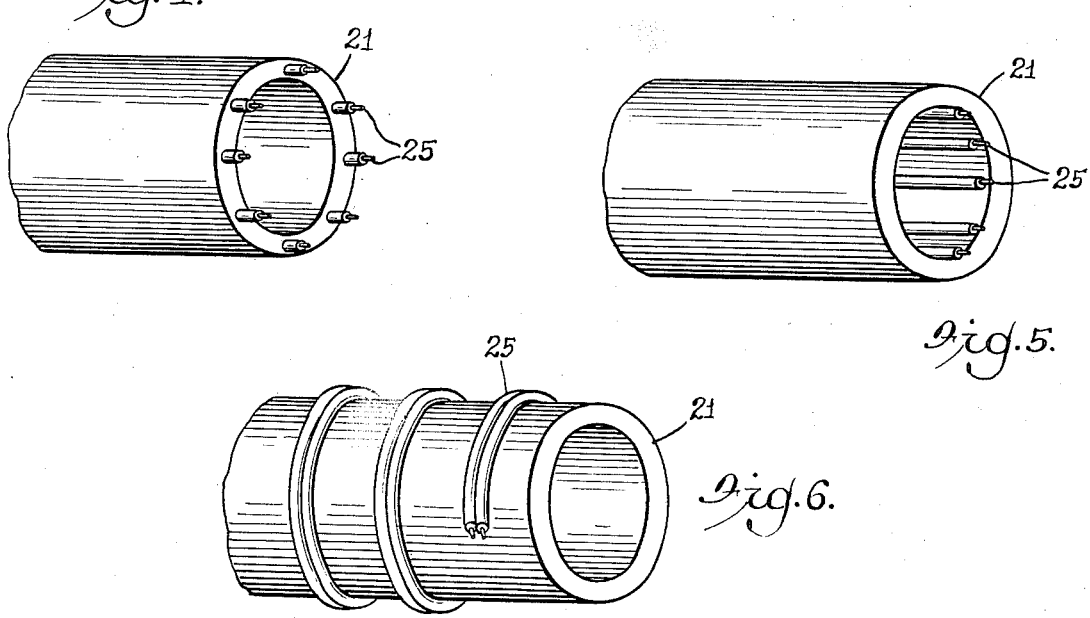

FLUID DISTRIBUTION TO MULTIPLE USERS THROUGH DISTRIBUTED INTELLIGENCE SUB-CENTERS

BACKGROUND OF THE INVENTION

1. Field of the Invention

This invention relates to a process and system for fluid distribution from a principal intelligence and fluid distribution center to multiple users through distributed intelligence sub-centers. Intelligence transmission from individual user valves and meters to the distributed intelligence sub-centers and from the distributed intelligence sub-centers to the principal intelligence and fluid distribution center is achieved in conjunction with the piping by means such as wires within the cavity, wires imbedded in the structure of the piping, wires along the exterior of the piping, fiber optics, or acoustic, electromagnetic or optical methods through the piping itself. The distributed intelligence sub-centers provide flow control, leak detection, pipe condition assessment, user meter reading, pipeline locator signals, and robot control for locating leaks and providing leak locator signals, flow control, pipeline repair or cleaning. The process of this invention provides a total system approach to improved safety and reduced operating costs for distribution systems particularly well suited for underground distribution of natural gas services.

1. Description of the Prior Art

Fluid distribution systems, such as natural gas distribution to residences and businesses, have generally been by underground piping from a central distribution center through service pipes to the individual user and through valves and meters at the user end of the service pipeline. Such systems require reading meters at the individual user location and are generally not monitored with respect to fluid theft or leakage. Further, to adjust the flow or to turn on or to turn off individual user service requires manual operation at the user location. Generally fluid flow control is governed by valves at the user service lines and at the central distribution center, valves in supply lines, if any, frequently being manual underground valves. Particularly when the fluid is gas, the user service lines or the supply lines are difficult to locate, especially by above-ground techniques. Damage to the service and the supply lines is greatly increased by the present difficulty in ascertaining their location.

U.S. Pat. No. 4,200,911 teaches control of flow rate and fluid pressure in a pipeline network by actual fluid consumption measurement to establish a demand pattern. The predicted demand pattern for each area is ascertained by comparing characteristics of each area with those of other areas having standard demand patterns and the pumps and valves are controlled on the basis of the predicted demand patterns. This system, however, cannot provide for unusual demands or emergencies.

U.S. Pat. No. 3,874,222 teaches a leak detection and location system for a pipeline carrying fluids at different than ambient temperatures by placement of temperature sensing means to the exterior of the pipeline. The temperature sensors are located in a trough to the exterior of a liquid pipeline or a canopy to the exterior of a gas pipeline and provide a signal to a central monitoring station when other than ambient temperature is detected. A wide variety of sonic leak detectors have been used for fluid lines as described in U.S. Pat. Nos. 4,083,229; 3,223,194; 3,055,209; 3,264,864, but none of these systems described in these patents provide the desired ease and sensitivity of leak detection for underground gas leaks.

Various methods have been used in the art for pipeline flow restriction such as exemplified by U.S. Pat. No. 4,291,727 and the references cited therein. However, the flow restrictor of the U.S. Pat. No. 4,291,727 requires, in the case of an underground pipe, that the pipe be exposed and a saddle device attached for interior access at the point where flow restriction or stoppage is desired.

The use of pigging devices has been known for cleaning gas collection lines and various methods have been used for monitoring the pigs in the pipelines as taught by U.S. Pat. No. 3,384,512.

Various methods for fluid flow control and fluid valve control have been used based upon pressure sensing as taught in U.S. Pat. No. 3,846,706; electronic measurement of liquid flow utilizing level and velocity detectors as taught by U.S. Pat. No. 4,202,211; electromagnetically controlled single water pipe flow with temperature control by mixing hot and cold for individual demands as taught by U.S. Pat. No. 2,908,017; control of fluid injection into the main stream of a system by a flow meter in the main stream as taught by U.S. Pat. No. 4,007,755; and various specific means of fluid valve control as taught by U.S. Pat. No. 3,946,287; and fiber optic control as taught by U.S. Pat. No. 4,306,314.

SUMMARY OF THE INVENTION

This invention relates to a process and system for fluid distribution from a principal intelligence and fluid distribution center to multiple users through a distributed intelligence sub-center. The distributed intelligence sub-center is in both intelligence and fluid communication through communication means and the pipeline with the user and with the principal intelligence and fluid distribution center. A user fluid meter is located at each user location and is intelligence identifiable by and in intelligence communication with its corresponding distributed intelligence sub-center through communication means and the piping. Through such communication, automatic and accurate reading of user meters may be made on demand from the distributed intelligence sub-center and summarized billing information or summarized flow information, as desired, may be transmitted to the principal intelligence and fluid distribution center. Likewise, the user valve controlling the flow of fluid therethrough is positioned at each user location and is also intelligence identifiable by and in intelligence communication with the distributed intelligence subcenter providing remote turn-on and turn-off of the individual user service through the piping. Such intelligence communication allows control and measurement of fluid flow to the individual user on a continuing basis by the distributed intelligence sub-center and by the principal intelligence and fluid distribution center through the sub-center.

The distributed intelligence sub-center also is capable of providing a signal through the intelligence communication system in conjunction with the pipeline providing for easy above-ground location of the pipeline. This signal may be used for a detection system mounted on excavation equipment in order to prevent the excavation equipment from striking the piping.

An important aspect of this invention is the control of robots within the piping system by the distributed intelligence sub-center. The robots may locate leaks and perform leak patching functions from the interior of the pipeline. The robots may also provide fluid flow control or stoppage in the pipeline and emit a signal at the leak site to aid an above-ground repair crew in pin-pointing the leak site. The robots may also perform cleaning functions on the interior of the pipe.

The intelligence communication in conjunction with the piping may be achieved by wires or fiber optics located exterior to, interior to, or within the piping structure, acoustic means, electromagnetic or optical means as known to the art.

The distributed intelligence subcenter system of processing information as used in the system of this invention provides a total system approach utilizing standardized equipment at each sub-center, the larger systems requiring only a larger principal intelligence and fluid distribution center, as opposed to the requirement of designing the entire system to accommodate the total size of distribution. The process of fluid distribution and the system for fluid distribution to individual users of this invention represents a total system approach rather than a piecemeal approach to the problems currently existing in, particularly, underground natural gas distribution systems. The system of this invention offers flexibility to permit its use in a variety of existing systems and distribution requirements.

It is an object of this invention to provide a fluid distribution system which utilizes identical distributed intelligence sub-center components regardless of the total size of the system.

It is another object of this invention to provide a gas utility distribution system providing remote, automatic and accurate reading of user meters.

It is yet another object of this invention to provide a fluid distribution system providing individual user remote turn-off and turn-on of fluid service.

It is still another object of this invention to provide a fluid distribution system having load leveling capabilities.

It is a further object of this invention to provide a fluid distribution system wherein maintenance costs are reduced by early discovery and repair of leaks in pipelines through the use of robots.

It is yet another object of this invention to provide reduced incidents of pipeline damage by providing a system in which the pipeline may be readily located by above-ground techniques.

It is another object of this invention to provide a fluid distribution system wherein leakage may be promptly detected by a continuous summation of user fluid use through a distributed intelligence sub-center and by comparing the summation of multiple distributed intelligence sub-center use with measurement of fluid flow from a principal intelligence and fluid distribution center.

These and other objects and advantages of this invention will become apparent from the following detailed description of preferred embodiments and from the drawings.

BRIEF DESCRIPTION OF THE DRAWINGS

FIG. 1 schematically shows an overall view of one embodiment of the system of this invention;

FIG. 2 schematically shows the relationship of intelligence between the user, distributed intelligence sub-center, and principal intelligence and fluid distribution center;

FIG. 3 schematically shows a portion of a distributed intelligence sub-center and its fluid distribution to individual users;

FIG. 4 shows one embodiment of intelligence communication by embedding of wires in the pipeline structure;

FIG. 5 shows another embodiment of intelligence distribution by wires located within the pipeline structure; and FIG. 6 shows another embodiment of intelligence communication by wires wound around the exterior of the pipeline structure.

DESCRIPTION OF PREFERRED EMBODIMENTS

FIG. 1 schematically shows an overall view of one embodiment of the system of this invention wherein principal intelligence and fluid distribution center 10 controls the flow of fluid through supply pipeline 11 to distributed intelligence sub-center 20, shown in FIG. 1 as 20a, 20b, 20c, 20d and 20e. The fluid distribution center can also be at a separate location removed from the principal intelligence center. The fluid is passed from the distributed intelligence sub-center 20 to user 30 through distribution pipeline 21 connecting with user pipelines 31. In a preferred embodiment, supply pipeline 11 in addition t providing fluid transport provides intelligence communication in conjunction with the pipeline between principal intelligence and fluid distribution center 10 and the distributed intelligence sub-center 20. It will be readily apparent to one skilled in the art of communication upon the reading of this description that communication between all or some of the components of the system may also be affected by radio waves or any other means external to the piping and this invention is intended to cover all such means of communication. As best shown in FIG. 3, distribution pipelines 21 and user pipelines 31 in addition to transporting the fluid, also provide intelligence transmission between intelligence identifiable user valve 32 and user meter 34 in intelligence communication through communication wires 35 in user pipeline 31 and communication wires 25 in distribution pipeline 21 to distributed intelligence sub-center 20. Each user valve 32 controls flow of fluid therethrough upon command from the distributed intelligence sub-center 20 and also communicates to distributed intelligence sub-center 20 the position of user valve 32 at all times. Each distributed intelligence sub-center 20 controlling fluid distribution to multiple users 30 may control the rate of fluid flow or may shut off or start up.the flow of fluid to any individual user through user valves 32. Likewise, user meter 34, upon being addressed by intelligence communication from the distributed intelligence sub-center reports via the intelligence communication through the pipeline to the distributed intelligence subcenter the fluid flow rate or the accumulated volumetric fluid flow over a period of time through user meter 34. Each distributed intelligence sub-center 20 has microcomputer 22 in communication through communication wires 25 and 35 with each user valve and user meter and sub-center distribution meter 13 and through communication wires 15 with a main computer in principal intelligence and distribution center 10.

One of the important aspects of the fluid distribution systems of this invention is illustrated in FIG. 2 showing intelligence flow between individual user valves and user meters and a corresponding distributed intelligence subcenter (DISC). Each distributed intelligence subcenter may monitor fluid flow for leakage throughout the user population it services. Each distribution intelligence sub-center, 20a, 20b, 20c and 20d, obtains meter readings from the user meters and supplies only necessary summary data for billing or overall fluid distribution to the principal intelligence center 10 (PIC). Thus, the distributed intelligence sub-centers may be standardized for providing service to a number of users and the overall system size adjusted by the number of subcenters and only the capability of the principal intelligence center need be adjusted for the size of the overall system. The distributed intelligence sub-center provides a network of microprocessors with decision capability distributed throughout the system and monitored by a modest central computer in the principal intelligence center.

User meters 34 may be located at any position in user pipeline 31, either within or near the user structure or close to distribution pipeline 21, both as shown in FIG. 3. Location of the user meters near the distribution pipelines would reduce vandalism and user theft. User meters suitable for use in the system of this invention may operate on any principle measuring fluid flow, such as positive displacement, rotary displacement, turbine or acoustic means of measurement. The user meters for use in the system of this invention are characterized by translating the meter reading into a data form for transmission to the distributed intelligence sub-center upon being addressed by a signal from the distributed intelligence sub-center.

In a preferred embodiment positive displacement meters with mechanical indicating arms are employed with the addition of an individual service unit, such as integrated circuit chips to digitally encode the meter reading into a electronic signal and to render each meter individually addressable. The integrated circuit chips may be activated to encode the meter reading and to transmit the reading to the corresponding distributed intelligence subcenter through the intelligence communication system of the piping. This is accomplished by use of an addressable two-way asynchronous communication chip as exemplified by CMOS circuit type MC14469T or similar devices as will be familiar to those skilled in the art. Each individual service unit is hard wired to have its own address and is enclosed within the service line until it reaches the main at which point it passes through the wall of the service line and is connected to the conductor cable. When the individual service unit receives a set of electronic pulses from a distributed intelligence sub-center, it first compares its address with the address pulse code that it has received. For the particular circuit indicated above, the last bit in the word indicates whether the word is an address or a data string, but it will be obvious to one skilled in the art how other specific circuits of a similar nature can be applied to achieve the same end. The particular circuit described above is capable of application to distributed intelligence sub-centers servicing 128 individual service units. Upon being activated, the individual service unit chip will activate the meter reading, switch on the indicator that indicates the rate in effect for the gas, terminate service, recharge the batteries in the meter, activate and interrogate an in-place leak detection system composed of microphones or other sensors in or attached to the main, or read either a water or electric meter if so desired by the utility. The circuit indicated above has considerable additional capability to perform other functions. In the described preferred embodiment, the meter reading may be performed by either reading of the mechanical positions of the meter hands by the same methods that are currently employed to remotely read meters or by optically chopping a light beam which is incident on a series of holes that are drilled in one of the gears in the mechanical gear train in the meter mechanism. This optical encoding, or alternatively, pulse counting can be accomplished by employing a light emitting diode and a light sensitive detector in a manner that will be familiar to one skilled in the art. The meter may be equipped with a pair of indicator lights that can be activated by a customer pressing a button on the meter display. The indicator will show whether the normal or an increased or reduced rate is in effect at that particular time for the gas purchased. These indicators are driven by and Q and $\overline{Q}$ outputs from any of the standard flip-flop circuits that are familiar to one skilled in the art. These flip-flop circuits are driven to change state by one of the output leads from the individual service unit circuit. Service termination is also the result of a signal originating within the individual service unit in response to an appropriate distributed intelligence sub-center code instruction. The signal drives an electrically activated valve mechanism of any standard design. Service cannot be restored unless a special key is used to reopen the valve mechanism and the state of the flip-flop is changed by an electrical command. The mechanism is prevented from running down associated batteries by a microswitch which is in series with the device and opens when the valve closes. The rechargeable batteries that are enclosed in the meter case protect the meter and its data from power failure. The system described above will be seen to fail in its position at the time of failure. Thus, a power failure neither terminates nor restores services and the batteries prevent loss of data during the failure. The batteries are recharged by using a transistor to switch the battery across the power and ground leads to allow it to be recharged. Alternatively, the battery can be charged from a flow powered device enclosed within the meter.

Since the reading is provided by a mechanical mechanism, meter information is not lost in the event of a power failure. The user meter for use in the system of this invention is compatible with the mechanical and the data carrying requirements of the system. Energy for the functioning of the user meter may be supplied through the pipline intelligence communication system or may be derived through flow energy extracted from the fluid flow in the system, or through external power lines. Such energy may be stored either mechanically or as electrical energy. Remote user meter reading capability benefits both the utility and the customer by reducing the operating cost of the distribution system. Further, the remote reading capability permits short term readings, such as on an hourly or multiple hourly basis to permit variable rate pricing to encourage off-peak consumption. Present systems use two meters to provide only two different rates. The user may also be provided with information of fluid consumption provided by user meter display 33, shown in FIG. 3. The user would cause the integrated circuit chip to present the user meter reading on an LED or LCD display. The user meter chip could also provide an output signal directed to the user's computer to afford the user a computer controlled energy management system, in the case of the supply of natural gas. More accurate metering of gas is possible by the user meter integrated circuit chips having a temperature sensor compensating the flow measurements for pressure and temperature variations.

Associated with user meter 34 is user valve 32. The same integrated circuit chip monitoring the user meter may also monitor and control the user valve. User valves suitable for use in the system of this invention are mechanical valves which remain in a set position unless provided an electrical signal for changing the valve position. Thus, in the event of an electrical failure, the user valves remain in the position in which they are at the time of failure. The user valve has a sensor which can inform the distributed intelligence sub-center of the valve positioning through the intelligence communication through the piping. Likewise, each user valve is intelligence identifiable and thus may be addressed by the distributed intelligence sub-center and actuated for a valve position change. One important capability of the system of this invention is enhanced user safety by providing for high speed centralized shutting down of gas service to a user's home in case of fire or emergency, or to a number of users simultaneously if there were a natural or accidental catastrophy in which user valves could not normally be reached. Also, service to an individual user may be readily turned off or turned on in cases of intermittent occupancy, such as summer homes or ski lodges. Further partial service shut down can be achieved in cases where it is desired to only supply gas sufficient for a selected number of user appliances, such as to provide sufficient gas to prevent users who do not pay for the service from suffering serious harm because of loss of gas service.

The distributed intelligence sub-center also controls valves in distribution pipelines 21 to control fluid flow to geographical areas of multiple users. The distribution pipeline valves desirably permit passage of robots through the distribution pipelines as will be more fully described herein. The distributed intelligence subcenter in communication consultation with the principal intelligence center may control and measure fluid flow from supply pipeline 11 to distribution pipelines 21 through supply valve 12 and sub-center supply meter 13.

All of the valves are standard design mechanical valves, such as gate or ball valves. The valve status, open or closed, may be indicated by a pair of light emitting diode and light sensitive detectors on opposite sides of the valve closing element. Power to operate the valves may be derived from internal batteries, electrical lines or from flow energy derived from passage of fluid through the system. The valves may be remotely addressed and operated using the same electronics as described above for the individual service units.

In cases of all of the valves, intelligence transmission must occur through or around valves regardless of the valve position. In the embodiments utilizing fibers or wires for intelligence transmission through the pipeline, this is readily accomplished by embedding the fibers or wires in the housing of the valve wall or by carrying the information through lines that are outside of the housing. In the embodiments using the interior of the pipe itself as a data conductor, such as acoustic systems, microwave and the like, the valve may use a repeater unit on each side of the valve to repeat the signal or the valve closing element may be fabricated from a material transparent to the data signal, such as plastics which are transparent to microwaves, making such repeaters unnecessary.

Intelligence communication between the user meters and user valves and the distributed intelligence sub-center may be achieved by any suitable means. External communication means, such as radio waves may be used. Internal communication means through the piping itself has several advantages. The pipe may have intelligence carrying lines embedded within its walls, as shown by wires 25 in FIG. 4, which may involve fiber optics or electrical transmission. The intelligence transmission lines, such as 25, may be in the interior of pipeline 21 as shown in FIG. 5, or to the exterior of pipeline 21 as shown in FIG. 6. When continuous intelligence transmission systems, such as fiber optics or electric wires, are used, the pipe connections and pipe fittings are constructed to accommodate connection of the intelligence transmission lines. When different modes of intelligence transmission are used in the same system, they must be interfaced between the portion of the system having one mode of data intelligence transmission and a second portion of the system having another mode of intelligence transmission, such as electrical conductors to fiber optics.

In case of electrical wires carrying intelligence throughout the pipeline, multiple parallel wires may be connected at intervals to provide a high degree of redundancy to the system in case of breakage of a wire. Embedding the electrical wire in plastic piping and in the plastic pipe fittings, protects the electrical conductors from corrosion. Optical fibers in the pipeline itself provide the advantages of sensitive acoustic, stress, and heat detection. Acoustic means of communication through the pipeline provide easiest retrofitting to existing systems.

In a preferred embodiment plastic pipe is formed and installed in the conventional manner. However, just prior to installation, two sets of four wires are installed below the pipes in separate cables. These wires are connected at intervals of approximately 30 meters to provide redundancy in the event of a break in one of the leads. The cables are separated from one another by approximately half of the pipe diameter. Two of the sets of wire are of a small gauge (20) and the other two are of heavy gauge (12). For installation in existing systems that are being renewed by insertion, the cables of wires are inserted into the old pipe at the same time the new mains are inserted. When the customer's service is installed or renewed, an electrical connection is made to the main cable to connect the customer's meter to the distributed intelligence sub-center. The electrical leads enter the service line near the main and enter the customer's premises encased in the line to prevent tampering with the system. Protection against electrical power failure is provided by generating the required electricity at each distributed intelligence sub-center with a gas turbine generator. This unit operates at 400 hertz to distinguish its signals from the 60 hertz of the electrical grid. The heavy gauge wires are called the power lead and the gound lead and the other two leads are called the transmit and receive leads. The receive lead carries data from the meter to the distributed intelligence sub-center and the transmit lead carries data from the distributed intelligence sub-center. The ground line is common to all circuits. The power lead is used to carry the buried pipe location signal which is generated at the distributed intelligence sub-center. In addition, the pipe is compatible with robot operation. The minimum pipe opening is large enough to permit the passage of robots which is at least 5 centimeters for mains. The radius of curvature of bends is large enough to permit robots to negotiate turns and therefore at least 8 pipe diameters. There are no obstructions into the pipe interior to interfere with robot passage and tees and crosses are large enough to permit robot turns. Installation of the pipe is done so as to avoid sharper inclines than robots can negotiate, and are thus not steeper than 30°. At each distributed intelligence sub-center there is also a robot port that is accessible from the surface to permit access to robots for periodic maintenance and replacement with special purpose and improved robots. At these robot ports, the robots can recharge their batteries and park out of the main flow path of the fluid.

In one preferred embodiment, leak detection may be built into the system by providing stationary acoustic sensors along the pipeline a part of the communication system.

In one preferred embodiment of this invention the piping has conductors capable of carrying a locator signal as part of the intelligence communication system, the locator signal being readily detectable by ground surface detection equipment. The detector signal can be continuously applied or intermittently applied as desired. With all of the underground piping carrying a locator signal, there should be a great reduction in damage to such piping. The damage may be even further reduced by providing an alarm on all digging equipment used in the vicinity of such pipelines, the alarm being adjusted to sound when the digging equipment is within a pre-selected distance from the pipeline.

Distributed intelligence sub-centers according to this invention are small computers which can record data, process and transmit summary data to a principal intelligence center, and implement programmed decisions. The distributed intelligence sub-center is capable of receiving intelligence from and transmitting intelligence to user meters, user valves, distribution pipeline valves, pipeline sensors, or robots within the territory covered by the distributed intelligence sub-center and transmitting locator signals. The locator signals may be detected by above ground detector 40. The distributed intelligence sub-center has means for addressing the individual meters, valves and robots, and means for identifying user meters, valves or robots which have transmitted intelligence to it. The distributed intelligence sub-center contains emergency procedure instructions, routines for sequential user meter readings and routines for computing and comparing actual and expected gas consumption. The distributed intelligence sub-center may process and transmit summary information from the use meters or valves or robots to the principal intelligence center through the supply pipelines. The microprocessor used in the distributed intelligence sub-centers may be of any suitable configuration which will perform the reading and calculation functions described above and will be appropriately interfaced with the lines that carry data to the rest of the system. In a preferred embodiment, the microprocessor is a NSC 800 microprocessor chip or its equivalent. The connection to the rest of the system is accomplished through use of any of the Universal Asynchronous Receiver/Transmitter chips which will be familiar to those skilled in the art. The distributed intelligence sub-center microprocessor is similarly connected to the principal intelligence center.

As shown schematically in FIG. 3, distributed intelligence sub-center 20 is physically an underground vault rendering a robot port 27 physically available for maintenance or replacement and has intelligence repeater 23 above ground for easy information access.

In a preferred embodiment of this invention, one or more robots may be used in connection with each distributed intelligence sub-center. As shown in FIG. 3, robot 28 is operated in distribution pipeline 21 from distributed intelligence sub-center 20. The dead end of distribution pipeline 21 within the distributed intelligence subcenter vault provides robot port 27 and robot storage section 26 readily accessible from the sub-center vault. Each robot is controlled by and provides information to its corresponding distributed intelligence sub-center. The robots may be battery powered and operate at low voltage within the pipeline, eliminating the danger of spark and the need for the robot to drag a wire which can become heavy and tangled. The robots may also derive energy from the system through tracks, powerlines or flow energy of the fluid. The robots may be designed to perform a number of functions such as leak detection, determination of pipe condition, repair of leaks from the interior of the pipe, and may transmit a "homing" signal to aid repair crews above ground in pinpointing the robot position in the pipe, such as for repair of a leak. The robot may also carry emergency flow stoppage equipment and may thus shut off fluid flow in a section of the system.

The robots may readily locate very small gas leaks by traveling through the pipe and using sonic leak detection equipment which is very sensitive due to its proximity to the leak. The robots may also provide visual or computer controlled image inspection of the pipe condition.

The primary requirements for robots for use in this invention are mechanical compatibility with the rest of the system hardware and the ability to communicate with the distributed intelligence sub-center even under conditions of system emergency, including major natural disaster. Because a variety of robots will be required for specialized tasks, only the general characteristics of robots will be described along with a few specific examples of robot configuration. Robots may have any configuration, but in general, they must provide minimal impediment to flow. In a preferred embodiment, robots are powered by rechargeable batteries and driven by electrical motors. Motors are of the explosion-proof design to eliminate. dangers of robot operation in situations of possible air leaks into the system. In general, robots are long, thin carts which are driven by two motor driven rear wheels. In the preferred embodiment, the robot is steered by a single front wheel. The steering wheel may be turned to the left or right and the wheels may be driven forward or backward at a proportionally controlled rate. The mechanism for constructing such a vehicle and controlling it remotely through radio waves is well known to those skilled in the art and is similar to the units that are available for remote controlled cars, boats and model airplanes. The robots contain a microprocessor similar to that used in the distributed intelligence sub-center and are programmed with a variety of routines for navigation and operation as well as communication. In a preferred embodiment, robots ar equipped with sensors that detect light (front, rear, and side) by means of light sensitive detectors, sound by a microphone of any standard design, water by means of a pair of wires that will conduct a current if water is present in the pipe and obstacles by means of spring loaded bumpers connected to electrical contacts that are closed if either the front or rear bumper encounters an obstacle. Robots also have a switch which closes if the robot turns upside down. In the event that the robot encounters certain emergency conditions inside the pipe, such as water, unexpected light, obstacles, or robot turnover, the robot microprocessor is programmed to inform the distributed intelligence subcenter of the sensor reading indicating an emergency condition. In a preferred embodiment, types LM1871 and LM1872 chips are used for transmission. Microphone sound readings ar encoded and transmitted to the distributed intelligence sub-center for analysis in searching for possible leak conditions. As a specific example of the types of robots that are used in a preferred embodiment, leak patrol robots and rescue robots will be described. Leak patrol robots are equipped with the normal complement of sensors described above and in addition to the normal low quality microphone, a high quality microphone is provided for detailed analysis of the sonic spectrum of the leak. The signal level can be transmitted to the distributed intelligence subcenter which will both assist the robot in locating the highest signal level location, thus pinpointing the leak, and compare the signal level with the levels expected for the flow conditions current in that part of the system. In addition, the signal can be transmitted directly for spectral analysis and interpretation of leak size and shape. The leak patrol robot can either transmit a homing signal by activating an acoustic transducer which will guide leak repair crews to the location or else release a charge of compressed carbon-dioxide to inflate a balloon type device to shut off the flow of gas to the leak area. Rescue robots are specifically designed to retrieve robots that become stranded because of turning over or running out of power. These robots are equipped with more powerful driving mechanisms and higher traction wheels than are standard robots in order to drag heavier loads. Stranded robots are connected to the rescue robots by a hook that latches over their bumpers.

Robot navigation is aided by several techniques. Distances are approximated by counting the revolutions of the non-driven wheel using an up-down counter that counts the wheel rotations. Navigational checkpoints are provided by flashing lights placed inside the pipe at critical locations. For example, when a robot approaches a particular valve, the distributed intelligence sub-center can instruct the valve computer chip to flash its condition indicating light emitting diode at a particular frequency. A map of the system with the distances, locations and frequency of each flashing light is programmed into the memory of the robot and the distributed intelligence sub-center. The light sensors on the robot can report the presence of a flashing light and its frequency and then using said map of the system when the light detector on the side of the robot detects the light, the distance counter can be corrected or reset to zero by the robot's microprocessor. Thus, precise location of the robot is recalibrated periodically and relayed to the distributed intelligence subcenter.

It will be apparent to one skilled in the art that there are many possible variations to the details, including method of information transmission that can be implemented and, for example, that many other integrated circuit components are currently available that could be used, or that will become available in the future, or that could be specifically designed and manufactured for the purposes described. The wide range of computer hardware available for the user valves and meters, robots, distributed intelligence sub-center and for the principal intelligence center has not been described in detail since it would be readily apparent to one skilled in the art upon reading this description. Likewise, particular mechanical valves, meters, robots and means of communication suitable will be readily apparent after reading the description of this invention. It is also apparent that the fluid distribution system of this invention, once installed, permits great flexibility in its use and its easy adaptation to advances in technology.

The installed intelligence communication system used in the fluid distribution system of this invention may be utilized for additional services. For example, the fluid distribution system of this invention used for gas distribution may be readily utilized for remote reading of water and electric meters by passing the meter electronic data output through the intelligence communication of the gas distribution system. Additional addressable individual service unit circuitry is not required to provide these additional functions since each is simply an additional function of the already in place individual service unit.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for fluid distribution through an underground pipeline system from a principal intelligence and fluid distribution center to multiple users comprising: passing said fluid in sequence from said principal distribution center to a distributed intelligence sub-center in intelligence communication with said principal distribution center and then to an intelligence identifiable user valve and meter for each user, said user valve and meter being in intelligence communication with said sub-center, wherein said intelligence communication is conducted through said pipeline capable of conducting said fluid and said intelligence, each said user valve controlling flow of said fluid therethrough upon command from said sub-center and providing valve position intelligence to said sub-center, said user meter providing flow intelligence of said fluid flow therethrough to said sub-center upon command, and providing summary intelligence from a plurality of said intelligence sub-centers to said principal center for general system control by control of fluid and intelligence to each of said intelligence sub-centers.

2. The process of claim 1 wherein said conduction of said intelligence through said pipeline is by wires within the cavity of said pipeline.

3. The process of claim 1 wherein said conduction of said intelligence through said pipeline is by wires embedded in the structure of said pipeline.

4. The process of claim 1 wherein said conduction of said intelligence through said pipeline is by acoustic means.

5. The process of claim 1 wherein said conduction of said intelligence through said pipeline is by fiber optics means.

6. The process of claim 1 wherein said conduction of said intelligence through said pipeline is by electromagnetic means.

7. The process of claim 1 wherein said conduction of said intelligence through said pipeline is by optical means.

8. A process for fluid distribution through an underground pipeline system from a principal intelligence and fluid distribution center to multiple users comprising: passing said fluid in sequence from said principal distribution center to a distributed intelligence sub-center in intelligence communication with said principal distribution center and then to an intelligence identifiable user valve and meter for each user, said user valve and meter being in intelligence communication with said sub-center, each said user valve controlling flow of said fluid therethrough upon command from said sub-center and providing valve position intelligence to said sub-center, said user meter providing flow intelligence of said fluid flow therethrough to said sub-center upon command, providing summary intelligence from a plurality of said intelligence sub-centers to said principal center for general system control by control of fluid and intelligence to each of said intelligence sub-centers, and said distributed intelligence sub-center emits a locator signal through said underground pipeline providing for detection of the location of said pipeline from the ground surface.

9. A process for fluid distribution through an underground pipeline system from a principal intelligence and fluid distribution center to multiple users comprising: passing said fluid in sequence from said principal distribution center to a distributed intelligence sub-center in intelligence communication with said principal distribution center and then to an intelligence identifiable user valve and meter for each user, said user valve and meter being in intelligence communication with said sub-center, each said user valve controlling flow of said flow of said fluid therethrough upon command from said sub-center and providing valve position intelligence to said sub-center, said user meter providing flow intelligence of said fluid flow therethrough to said sub-center upon command, providing summary intelligence from a plurality of said intelligence sub-centers to said principal center for general system control by control of fluid and intelligence to each of said intelligence sub-centers, and said distributed intelligence sub-center controls at least one robot operating within said pipeline and in intelligence communication with said sub-center.

10. The process of claim 9 wherein said robot(s) detect and locate leaks in said pipeline and transmit such intelligence to said sub-center.

11. The process of claim 10 wherein said robot(s) emits a locator signal for detection of location of said leak.

12. The process of claim 9 wherein said robot(s) provides flow control in said pipeline.

13. The process of claim 9 wherein said robot(s) applies patches to the inside of said pipeline repairing leaks.

14. The process of claim 9 wherein said robot(s) cleans the interior of said pipelines.

15. In a process for liquid distribution through an underground pipeline system from a principal intelligence and fluid distribution center through a distributed intelligence sub-center to multiple users, the steps comprising: transmitting intelligence from individual users to said distributed intelligence sub-center to said principal intelligence center through said pipeline capable of conducting said fluid and said intelligence.

16. In a process for liquid distribution through an underground pipeline system from a principal intelligence and fluid distribution center through a distributed intelligence sub-center to multiple users, the steps comprising: transmitting intelligence from individual users to said distributed intelligence sub-center to said principal intelligence center in conjunction with said pipeline, and said distributed intelligence sub-center emitting a locator signal through underground pipeline providing for detection of the location of the pipeline from the ground surface.

17. In a process for liquid distribution through an underground pipeline system from a principal intelligence and fluid distribution center through a distributed intelligene sub-center to multiple users, the steps comprising: transmitting intelligence from individual users to said distributed intelligence sub-center to said principal intelligence center in conjunction with said pipeline, and said distributed intelligence sub-center controlling at least one robot operating withing said pipeline and in intelligence communication with said sub-center.

18. An underground pipeline fluid distribution system to multiple users comprising:
 a principal intelligence and distribution center;
 multiple distributed intelligence sub-centers;
 an underground pipeline system in fluid communication through a supply pipeline with said principal distribution center and said sub-centers and in fluid communication through distribution pipelines and branching user pipelines with a user fluid meter serving each said user;
 intelligence means at each said user fluid meter capable of individual identification and activation in intelligence communication conducted through said pipeline capable of conducting said fluid and said intelligence with its corresponding distributed intelligence sub-center; and
 intelligence means at each said distributed intelligence sub-center in intelligence communication conducted through said pipeline capable of conducting said fluid and said intelligence with said principal intelligence center.

19. The underground pipeline fluid distribution system of claim 18 wherein said conduction of said intelligence through said pipeline is by wires within the cavity of said pipeline.

20. The underground pipeline fluid distribution system of claim 18 wherein said conduction of said intelligence through said pipeline is by wires embedded in the structure of said pipeline.

21. The underground pipeline fluid distribution system of claim 18 wherein said conduction of said intelligence through said pipeline is by acoustic means 22. The underground pipeline fluid distribution system of claim 18 wherein said conduction of said intelligence through said pipeline is by fiber optics means.

23. The underground pipeline fluid distribution system of claim 18 wherein said conduction of said intelligence through said pipeline is by electromagnetic means.

24. The underground pipeline fluid distribution system of claim 18 wherein said conduction of said intelligence through said pipeline is by optical means.

25. An underground pipeline fluid distribution system to multiple users comprising:
 a principal intelligence and distribution center;

multiple distributed intelligence sub-centers, each said distributed intelligence sub-center comprises means for emitting a locator signal through underground pipeline providing for detection of the location of said pipeline from the ground surface;

an underground pipeline system in fluid communication through a supply pipeline with said principal distrbution center and said sub-enters and in fluid communication through distribution pipelines and branching user pipelines with a user fluid meter serving each said user;

intelligence means at each said user fluid meter capable of individual identification and activation in intelligence communication with its corresponding distributed intelligence sub-center;

intelligence means at each said distributed intelligence sub-center in intelligence communication with said principal intelligence center.

26. An underground pipeline fluid distribution system to multiple users comprising:

a principal intelligence and distribution center;

multiple distributed intelligence sub-centers, each said distributed intelligence sub-center comprises means for controlling at least one robot operating within said pipeline and in intelligence communication with said sub-center;

an underground pipeline system in fluid communication through a supply pipeline with said principal distribution center and said sub-centers and in fluid communication through distribution pipelines and branching user pipelines with a user fluid meter serving each said user;

intelligence means at each said user fluid meter capable of individual identification and activation in intelligence communication with its corresponding distributed intelligence sub-center;

intelligence means at each said distributed intelligence sub-center in intelligence communication with said principal intelligence center.

* * * * *